United States Patent
Mueller et al.

(10) Patent No.: US 11,021,158 B2
(45) Date of Patent: Jun. 1, 2021

(54) VEHICLE DYNAMICS CONTROL SYSTEM IN A MOTOR VEHICLE AND ELECTRONIC VEHICLE DYNAMICS CONTROL UNIT FOR A VEHICLE DYNAMICS CONTROL SYSTEM

(71) Applicant: Bayerische Motoren Werke Aktiengesellschaft, Munich (DE)

(72) Inventors: Torsten Mueller, Munich (DE); Thomas Eberl, Sauerlach (DE); Andreas Baier, Rosenheim (DE); Marc Espenhain, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 306 days.

(21) Appl. No.: 15/975,062

(22) Filed: May 9, 2018

(65) Prior Publication Data

US 2018/0257652 A1 Sep. 13, 2018

Related U.S. Application Data

(63) Continuation of application No. PCT/EP2016/076960, filed on Nov. 8, 2016.

(30) Foreign Application Priority Data

Nov. 10, 2015 (DE) ..................... 10 2015 222 059.1

(51) Int. Cl.
*B60W 30/188* (2012.01)
*B60K 28/16* (2006.01)
(Continued)

(52) U.S. Cl.
CPC ........... *B60W 30/188* (2013.01); *B60K 28/16* (2013.01); *B60L 15/2045* (2013.01);
(Continued)

(58) Field of Classification Search
CPC ............... B60W 10/08; B60W 30/188; B60W 50/0098; B60W 50/06; B60W 2050/0006;
(Continued)

(56) References Cited

U.S. PATENT DOCUMENTS 5,473,544 A 12/1995 Yamashita
5,737,714 A 4/1998 Matsuno et al.
(Continued)

FOREIGN PATENT DOCUMENTS

CN 102574511 A 7/2012
CN 102892658 A 1/2013
(Continued)

OTHER PUBLICATIONS

Setpoint _ Definition of Setpoint at Dictionary.com.pdf (Setpoint | Definition of Setpoint at Dictionary.com, Sep. 28, 2020, Dictionary. com, pp. 1-4) (Year: 2020).*
(Continued)

*Primary Examiner* — Bao Long T Nguyen
(74) *Attorney, Agent, or Firm* — Crowell & Moring LLP

(57) ABSTRACT

A vehicle dynamics control system in a motor vehicle includes an electronic vehicle dynamics control unit which is connected to at least one drive control unit and is configured so as to: determine at least one setpoint slip or a setpoint slip corridor and an actual vehicle speed as a reference speed, and transmit the at least one setpoint slip or the setpoint slip corridor together with the reference speed to the at least one drive control unit. The drive control unit, in accordance with the transmitted values and by way of a function module, determines setpoint rotational speed values at a motor level and carries out a rotational speed control process.

14 Claims, 3 Drawing Sheets

(51) Int. Cl.
*B60W 50/00* (2006.01)
*B60W 50/06* (2006.01)
*B60L 15/20* (2006.01)

(52) U.S. Cl.
CPC ........ *B60W 50/0098* (2013.01); *B60W 50/06* (2013.01); *B60L 2240/421* (2013.01); *B60L 2240/423* (2013.01); *B60W 2050/0006* (2013.01); *B60W 2710/081* (2013.01); *Y02T 10/72* (2013.01)

(58) Field of Classification Search
CPC ..... B60W 2510/081; B60W 2710/081; B60W 10/06; B60W 40/10; B60W 2710/0644; B60K 28/16; B60L 15/2045; B60L 2240/421; B60L 2240/423; B60L 3/10; B60L 2240/465; B60L 15/20; Y02T 10/7258
USPC ...................................... 701/22, 101, 71, 82
See application file for complete search history.

(56) References Cited

U.S. PATENT DOCUMENTS

| | | | |
|---|---|---|---|
| 6,321,154 | B1 | 11/2001 | Schmitt et al. |
| 6,321,865 | B1 * | 11/2001 | Kuribayashi .......... B60K 6/383 180/243 |
| 6,349,782 | B1 * | 2/2002 | Sekiya .................. B60W 10/08 180/65.25 |
| 2002/0041167 | A1 | 4/2002 | Kitano et al. |
| 2010/0204895 | A1 | 8/2010 | Ziegler |
| 2012/0130581 | A1 | 5/2012 | Semsey et al. |
| 2013/0035818 | A1 | 2/2013 | Meitinger et al. |
| 2014/0114498 | A1 | 4/2014 | Pichler et al. |
| 2014/0249721 | A1 | 9/2014 | Schindler et al. |
| 2014/0274560 | A1 | 9/2014 | Tassinger et al. |
| 2014/0343774 | A1 | 11/2014 | Wimmer et al. |
| 2015/0060173 | A1 | 3/2015 | Okubo et al. |
| 2015/0162862 | A1 * | 6/2015 | Brunner ................ B60W 20/00 318/461 |

FOREIGN PATENT DOCUMENTS

| | | |
|---|---|---|
| CN | 103619686 A | 3/2014 |
| CN | 103687771 A | 3/2014 |
| CN | 103946603 A | 7/2014 |
| CN | 104114431 A | 10/2014 |
| CN | 104163106 A | 11/2014 |
| DE | 43 29 835 A1 | 3/1994 |
| DE | 196 03 427 A1 | 8/1996 |
| DE | 196 32 939 A1 | 10/1997 |
| DE | 198 37 521 A1 | 2/2000 |
| DE | 101 35 192 A1 | 1/2002 |
| DE | 10 2004 057 834 A1 | 7/2006 |
| DE | 10 2006 007 740 A1 | 8/2007 |
| DE | 10 2009 020 794 A1 | 11/2010 |
| DE | 10 2010 014 971 A1 | 10/2011 |
| DE | 10 2010 061 918 A1 | 6/2012 |
| DE | 10 2011 079 668 B3 | 8/2012 |
| DE | 10 2011 078 271 A1 | 1/2013 |
| DE | 10 2014 217 035 A1 | 3/2015 |

OTHER PUBLICATIONS

German Search Report issued in counterpart German Application No. 10 2015 222 059.1 dated Jul. 12, 2016 with partial English-language translation (Eleven (11) pages).

Isermann et al., "Fahrdynamik-Regelung: Modellbildung, Fahrerassistenzsysteme, Mechatronik", Mit 340 Abbildungen und 28 Tabellen, Sep. 2006, pp. 1-30.

International Search Report (PCT/ISA/210) issued in PCT Application No. PCT/EP2016/076960 dated Feb. 16, 2017 with English-language translation (Seven (7) pages).

German-language Written Opinion (PCT/ISA/237) issued in PCT Application No. PCT/EP2016/076960 dated Feb. 16, 2017 (Six (6) pages).

Chinese-language Office Action issued in Chinese Application No. 201680059198.8 dated Jun. 2, 2020 with English translation (17 pages).

* cited by examiner

VEHICLE DYNAMICS CONTROL SYSTEM IN A MOTOR VEHICLE AND ELECTRONIC VEHICLE DYNAMICS CONTROL UNIT FOR A VEHICLE DYNAMICS CONTROL SYSTEM

CROSS REFERENCE TO RELATED APPLICATIONS

This application is a continuation of PCT International Application No. PCT/EP2016/076960, filed Nov. 8, 2016, which claims priority under 35 U.S.C. § 119 from German Patent Application No. 10 2015 222 059.1, filed Nov. 10, 2015, the entire disclosures of which are herein expressly incorporated by reference.

BACKGROUND AND SUMMARY OF THE INVENTION

The present invention relates to a vehicle dynamics open-loop or closed-loop control system and to an open-loop or closed-loop control device, in particular in the form of electronic control units with correspondingly programmed function modules for a motor vehicle for carrying out a vehicle dynamics open-loop or closed-loop control process. In the text which follows, the term control will be used for open-loop control and closed-loop control for the purpose of simplification.

Numerous devices and methods for traction control systems and/or brake slip control systems are known, which either alone or in conjunction with superordinate driving stability systems improve the braking power and traction power as well as the driving stability or the driving dynamics under a very wide variety of driving conditions. These systems are based in terms of hardware on, for example, an electromechanical-hydraulic actuator system, electromechanical-pneumatic actuator system or a purely electromechanical actuator system, in conjunction with an electronic open-loop or closed-loop control unit and with a varied associated sensor system. In addition, the known systems have conventional interfaces and/or bus connections to activation elements and switching elements as well as to further open-loop or closed-loop control systems and display units in the overall vehicle system.

Customary vehicle dynamics control systems essentially control, on the one hand, the drive torque of at least one drive engine or motor (internal combustion engine and/or electric motor) and, on the other hand, also the wheel braking torques by means of individual braking interventions, for example as a function of the slip, frictional engagement, coefficient of friction, lateral acceleration, longitudinal acceleration, longitudinal inclination, lateral inclination, yaw angle and/or sideslip angle (that is to say generally as a function of the driving state). In the case of vehicles with an internal combustion engine, the drive torque is usually controlled by filling interventions, ignition angle interventions and/or injection shut-off interventions.

In the case of stability and traction systems of the contemporary type, the control errors which are to be compensated are determined on the basis of the difference between a setpoint slip and an actual slip or a setpoint rotational speed and an actual rotational speed. A setpoint slip can be related, for example, to an individual wheel or axle. The actual slip is usually determined on the basis of an individual wheel rotational speed or an axle rotational speed (=mean value of the wheel rotational speeds of one axle) compared to a reference rotational speed or reference speed which is derived from the actual vehicle longitudinal speed ($v_x$) overground. This actual vehicle longitudinal speed can, for example, be directly measured or can be a model variable which is formed from a sensor fusion of different sensors (e.g. wheel rotational speed sensor, longitudinal acceleration, etc.).

FIG. 3 illustrates an example of a known method for vehicle dynamics control. Here, an actual slip $s_{act}$ is determined in a control unit 2 for vehicle dynamics control in a motor vehicle 1 from the vehicle longitudinal speed $v_x$ and the determined wheel rotational speeds $n_{VL}$, $n_{VR}$, $n_{HL}$ and $n_{HR}$. In a setpoint value generating module S, a setpoint slip $S_{setp}$ is predefined in particular from the lateral acceleration $a_y$, the coefficient of friction $\mu$, the yaw rate deviation $\Delta\Psi/dt$ (sensor yaw rate/model yaw rate) and the vehicle longitudinal speed $v_x$. In order to compensate the slip difference ds, a setpoint torque $M_{setp}$ is determined in a control module MR and passed on as setpoint value to at least one electronic drive control unit 3 for controlling an internal combustion engine 4 and/or an electronic drive control unit 5 for controlling an electric machine as a setpoint value. Coordination modules K1 and K2 which are provided in the electronic drive control units 3 and 5, for example in the form of what is referred to as a torque structure, convert this setpoint torque $M_{setp}$ into control signals for correspondingly actuating the actuators of the drive units 4 and/or 6.

The technical subject matters of DE 10 2010 061 918 A1 and DE 10 2004 057 834 A1 are examples of vehicle dynamics control systems according to the prior art described above, that is to say in particular open-loop and/or closed-loop control systems for two-track and two-axle motor vehicles, wherein by means of a driving stability control system, brake control system or traction control system (such as e.g. DSC or DXC in the Applicant's vehicles, ESP, center clutch or ASC) the drive torque (engine torque) can be actively influenced and/or, if appropriate, additionally or alternatively wheel-selective braking interventions can be carried out at driven and non-driven wheels when a predefined wheel slip occurs or when a defined vehicle instability occurs. In this context, wheel slip is usually detected when one or more predefined setpoint slip thresholds are exceeded, and therefore a control deviation occurs.

The object of the invention is to improve a method and device for vehicle dynamics control with respect to their reaction speed.

The vehicle dynamics control system according to the invention has an electronic vehicle dynamics control unit which is connected to at least one drive control unit and is configured in such a way that it firstly determines a setpoint slip or a setpoint slip corridor and the actual vehicle speed as a reference speed. In this context, the setpoint slip corridor is preferably predefined by a minimum permissible setpoint slip for the overrun mode and a maximum permissible setpoint slip for the traction mode in the respective current driving situation.

According to a first alternative, in accordance with the setpoint slip or the setpoint slip corridor, a setpoint rotational speed or a setpoint rotational speed corridor is output to the at least one drive control unit. In this context, the setpoint rotational speed corridor is preferably predefined, in accordance with the setpoint slip corridor, by a minimum permissible rotational speed threshold for the overrun mode and a maximum permissible rotational speed threshold for the traction mode. The rotational speed corridor according to the first alternative is therefore calculated from a, in this driving situation, maximum permissible drive slip and deceleration slip.

According to a second alternative, the setpoint slip is output together with the reference vehicle speed directly to the at least one drive control unit, wherein the drive control unit itself determines therefrom a setpoint rotational speed at the motor level. In this second alternative, it is also possible to output, in a way analogous to the first alternative, a setpoint slip corridor instead of a setpoint slip value, which corridor is, in turn, converted into a setpoint rotational speed corridor by the drive control unit.

Where necessary, a rotational speed control process is subsequently carried out by the at least one drive control unit as a function of the setpoint values or of the setpoint corridors in both alternatives. The drive control unit of course in any case continuously detects the actual rotational speed.

A drive control unit can be, for example, a motor control device or a transmission control device. The rotational speed control process can be carried out, for example, by a correspondingly programmed function module in the motor control device, by actuating actuators of the motor and/or by a correspondingly programmed function module in the transmission control device by actuating actuators in an (automatic) transmission. In gear shift processes, the transmission control device can actively perform adjustment to the setpoint rotational speeds and adapt the gear shift process correspondingly.

The actual rotational speed of the drive is determined, for example, from the drive sensor (e.g. crankshaft sensor or rotor position sensor).

The interface and the control principle can also be transferred in an analogous fashion, for example, to control units of differentials, center clutches and wheel hub motors, which are therefore also included in a wider sense under the term vehicle dynamics control systems. The invention is based on the following realizations.

In particular in motor vehicles with electric drive motors (electric motors) but also in modern highly dynamic internal combustion engines with high power, the predefinition of a setpoint torque as described above by the control unit for vehicle dynamics control comes up against its limits. The control quality is unsatisfactory owing to the complexity of the controlled system and the latency time in the switching technology of the drive control units. In order to improve the comparatively slow traction control of the vehicle dynamics control systems by means of the predefinition of a setpoint torque, a high degree of expenditure in the application and the configuration of components is necessary owing to the high material load. The high dynamics potential, specifically in in electric machines, cannot be sufficiently used.

Therefore, according to the invention the traction controller is relocated from inside the electronic control unit of the vehicle dynamics control system to near to the actuator, wherein the respective drive control unit is considered to be the actuator.

The interface in the on-board power system for communicating a setpoint value from the vehicle dynamics control unit to the at least one drive control unit is changed according to the invention from a torque interface into a rotational speed interface or a setpoint slip interface (including the transmission of the reference speed or reference rotational speed).

The start of control is predefined in conventional traction control systems by the vehicle dynamics control unit. In this context, a perceptible jolt may occur in the vehicle owing to the transmission times between the control devices. By using the invention, the drive control device decides autonomously when there is a need for control. The jolt is therefore avoided.

If two independent drive motors are present (such as e.g. in the case of road-coupled axle hybrids), wheel-specific or axle-specific setpoint rotational speeds or setpoint rotational speed corridors or setpoint slip values or setpoint slip corridors can be predefined, including the reference speed.

Other objects, advantages and novel features of the present invention will become apparent from the following detailed description of one or more preferred embodiments when considered in conjunction with the accompanying drawings.

DETAILED DESCRIPTION OF THE DRAWINGS

Figure 1:
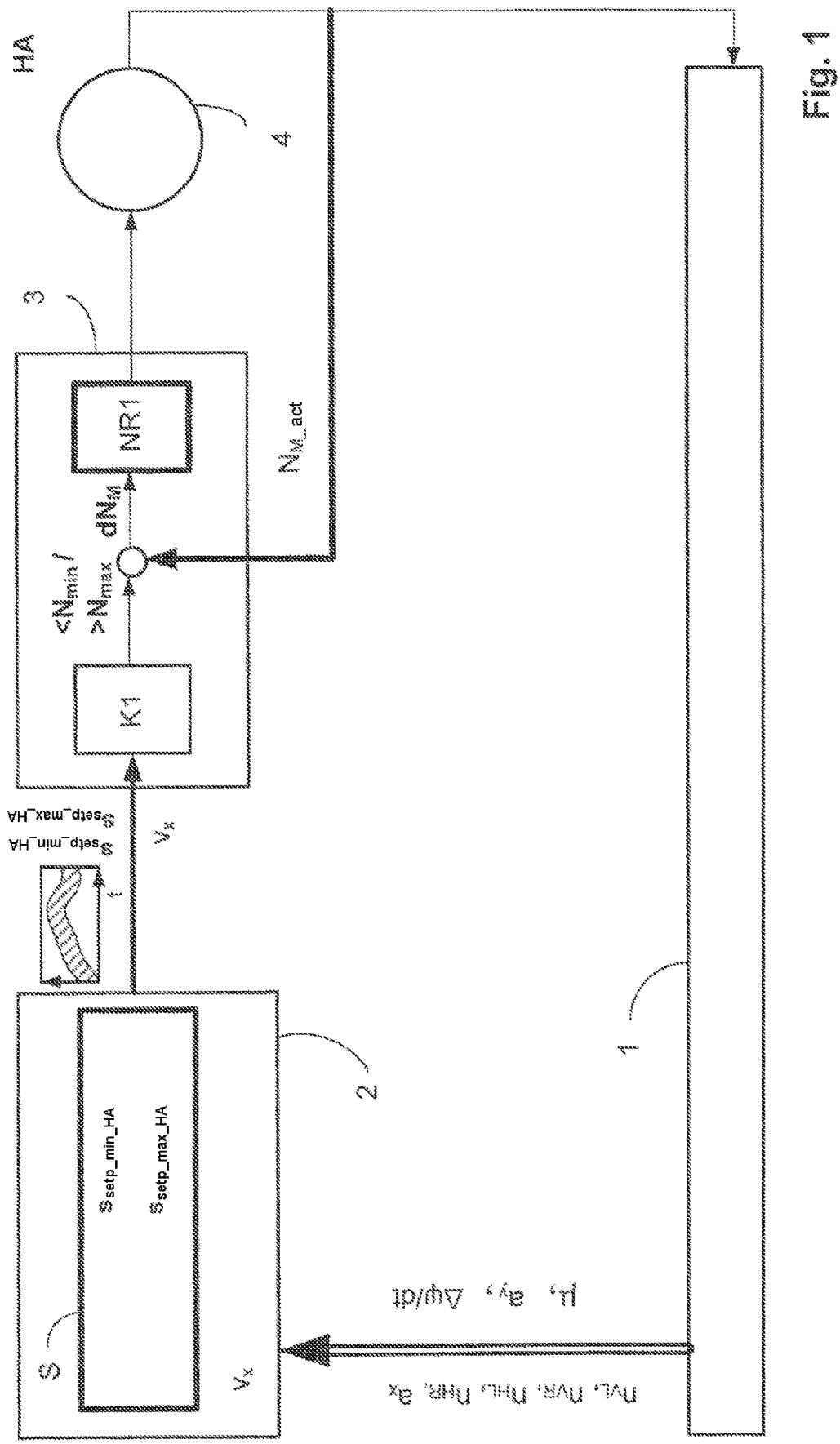
FIG. 1 is a schematic view of the components which are essential for the method according to the invention and their method of action in a motor vehicle with a rear wheel drive and just one drive motor by way of example as well as, with a setpoint slip interface here.

FIG. 1 is a schematic illustration of a vehicle dynamics control system for a motor vehicle 1 or in a motor vehicle 1 with an electronic vehicle dynamics control unit 2, which unit is connected to an electronic drive control unit 3. The electronic drive control unit 3 is provided, for example, for controlling an internal combustion engine 4 for driving a rear axle HA.

The vehicle dynamics control unit 2 is configured, in particular by way of correspondingly programmed function modules, for example by a setpoint value generating module S, in such a way that firstly, as in the prior art described above, the actual vehicle longitudinal speed $v_x$ is determined as a reference speed or reference rotational speed, for example, from the measured wheel rotational speeds $n_{VL}$, $n_{VR}$, $n_{HL}$ and $n_{HR}$ as well as from the signal $a_x$ of a longitudinal acceleration sensor. Furthermore, a setpoint slip $S_{setp}$ for the rear axle HA is determined from the lateral acceleration $a_y$, the coefficient of friction $\mu$, the yaw rate deviation $\Delta\Psi/dt$ and the vehicle longitudinal speed $v_x$. In this context, a minimum permissible setpoint slip $S_{setp\_min}$ for the overrun mode and a maximum permissible setpoint slip $S_{setp\_max}$ for the traction mode are preferably determined.

In this exemplary embodiment, a setpoint slip corridor in the form of the setpoint slip values $S_{setp\_min\_HA}$ and $S_{setp\_max\_HA}$ is therefore transmitted, together with the vehicle longitudinal speed $v_x$ as a reference speed, to the drive control unit 3. The drive control unit 3 itself calculates therefrom, with knowledge of the dynamic wheel radius, the respectively necessary setpoint rotational speed N_min for the overrun mode and N_max for the traction mode:

$$N\_\min = v_x \times (1 - S_{setp\_min\_HA})$$

$$N\_\max = v_x \times (1 + S_{setp\_max\_HA})$$

Furthermore, the actual rotational speed $N_{M\_act}$ of the drive motor 4 is detected by the drive control unit 3. In a correspondingly programmed rotational speed control module NR1, the rotational speed difference $dN_M$ between the actual rotational speed $N_{M\_act}$ and a value outside the rotational speed band formed by the two motor rotational speed thresholds ($N_{max}/N_{min}$) is then compensated, that is to say in the case of an actual rotational speed $N_{M\_act} > N_{max}$ or $< N_{min}$.

Figure 2:
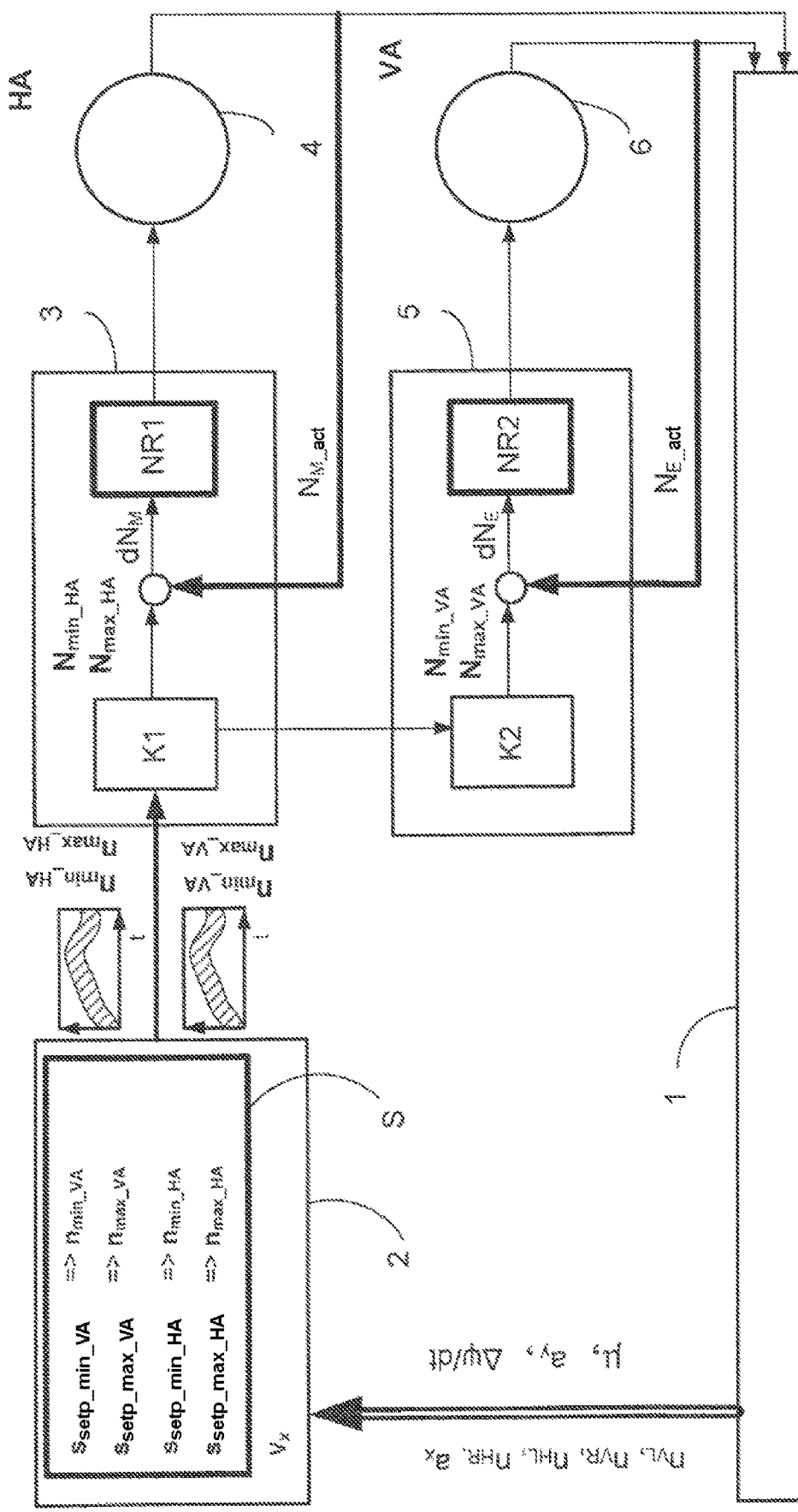
FIG. 2 is a schematic view of the components which are essential for the method according to the invention and their method of action in a motor vehicle with a road-coupled axle hybrid all-wheel drive as well as, by way of example, with a setpoint rotational speed interface here.
Figure 3:
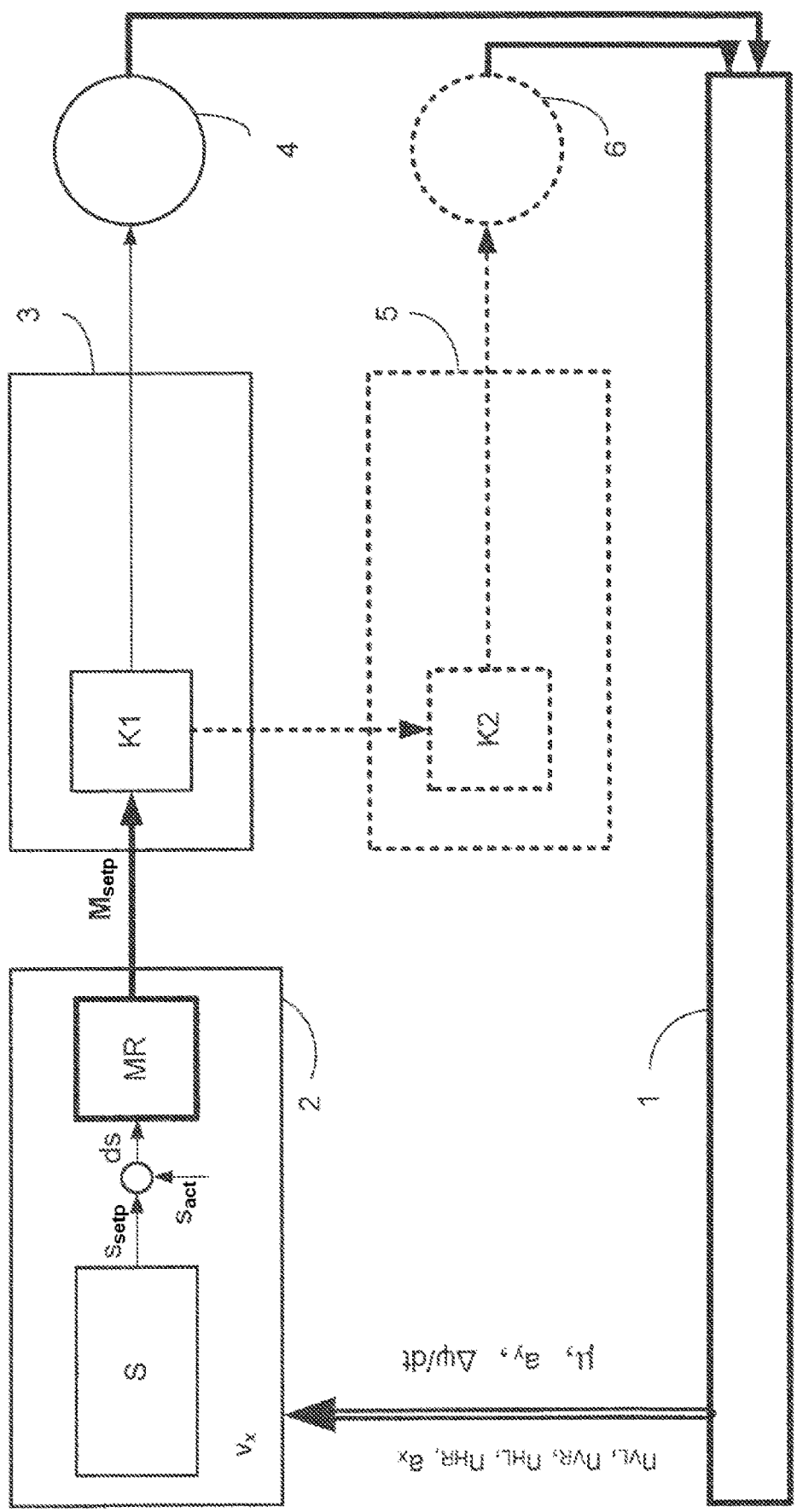
FIG. 3 is a schematic view of the prior art.

FIG. 2 illustrates a second exemplary embodiment in which a first drive control unit 3 for controlling an internal combustion engine 4 for driving a first axle HA (e.g. rear axle) and a second drive control unit 5 for controlling an electric motor 6 for driving a second axle VA (e.g. front axle) are provided.

With respect to the basic method of functioning according to the invention of the drive control units 3 and 5, reference is made to the statements regarding the drive control unit 3 according to FIG. 1. Firstly, minimum and maximum setpoint slip values $S_{setp\_min}$ and $S_{setp\_max}$ are therefore determined here both for the rear axle HA and for the front axle VA in the vehicle dynamics control unit 2. In contrast to the exemplary embodiment according to FIG. 1, the vehicle dynamics control unit 2 here determines, on the basis of these setpoint slip values and the determined vehicle reference speed $v_x$, a minimum permissible rotational speed threshold $n_{min\_HA}$ and a maximum permissible rotational speed threshold $n_{max\_HA}$ for the first axle HA as well as a minimum permissible rotational speed threshold $n_{min\_VA}$ and a maximum permissible rotational speed threshold $n_{max\_VA}$ for the second axle VA and outputs them to the first and/or second drive control unit 3 and/or 5.

The setpoint rotational speed corridors determined in this way are in this case transmitted by the vehicle dynamics control unit 2 to the drive control unit 3. The drive control unit 3 is, in particular, also configured by corresponding programming of a function module, e.g. coordination module K1, in such a way that the minimum permissible rotational speed threshold $n_{min}$ and the maximum permissible rotational speed threshold $n_{max}$ at the wheel level are respectively converted into a minimum permissible rotational speed threshold $N_{min}$ and a maximum permissible rotational speed threshold $N_{max}$ at the drive motor level, provided that the vehicle dynamics control unit 2 does not already predefine these rotational speed thresholds itself at the motor level.

In this example, all the values are output only to the drive control unit 3, which itself processes the minimum permissible rotational speed threshold $n_{min\_HA}$ and the maximum permissible rotational speed threshold $n_{max\_HA}$ for the rear axle HA and passes on the minimum permissible rotational speed threshold $n_{min\_VA}$ and the maximum permissible rotational speed threshold $n_{max\_VA}$ for the front axle VA to the drive control unit 5 for further processing. The rotational speed control processes are subsequently respectively carried out separately for each axle HA and VA by the rotational speed control modules NR1 and NR2 of the two drive control units 3 and 5 in a way analogous to the procedure according to the first exemplary embodiment.

It has been recognized that firstly the rotational speed and/or the slip as setpoint value, instead of the torque as setpoint value, gives rise to more rapid compensation of a slip deviation, and in that secondly the use of a setpoint corridor, instead of a setpoint value, also perceptibly increases comfort.

A development of the invention for all-wheel vehicles according to which, in the case of all-wheel drives, a differential slip control process is carried out during which the predefinition of the setpoint value of one axle (e.g. the front axle) is a function of the actual value of the other axle (e.g. the rear axle) is particularly advantageous. In the application example according to FIG. 2, the setpoint slip of the front axle results from the measured actual slip of the rear axle plus a differential slip factor which can be developed empirically as a function of the driving situation. By means of the differential slip factor it is possible to develop a defined all-wheel driving behavior in a way comparable to a mixed arrangement of tires with different wheel radii on the front and rear axles. This mixed tire arrangement approach has a very positive effect on handling capability and reproducibility in test runs. With the control approach described above it is then possible to render this driving behavior independently of the tire arrangement.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A vehicle dynamics control system in a motor vehicle, comprising:
   an electronic vehicle dynamics control unit connected to and distinct from at least one electronic drive control unit and configured to:
   determine at least one slip setpoint or a slip setpoint corridor and an actual vehicle speed as a reference speed; and
   transmit the at least one slip setpoint or the slip setpoint corridor together with the reference speed to the at least one electronic drive control unit, wherein
   the at least one electronic drive control unit, in accordance with the transmitted slip setpoint or slip setpoint corridor, is configured to determine setpoint rotational speed values at a motor level and carry out a rotational speed control process.

2. The vehicle dynamics control system as claimed in claim 1, wherein
   the slip setpoint corridor is predefined by a minimum permissible slip setpoint for an overrun mode and by a maximum permissible slip setpoint for a traction mode, and/or
   the rotational speed setpoint corridor is predefined by a minimum permissible rotational speed threshold for the overrun mode and by a maximum permissible rotational speed threshold for the traction mode.

3. The vehicle dynamics control system as claimed in claim 2, wherein
   the at least one electronic drive control unit further comprises:
   a first electronic drive control unit configured to control a first drive motor for driving a first axle; and
   a second electronic drive control unit, distinct from the first electronic drive control unit and the vehicle dynamics control unit, configured to control a second drive motor for driving a second axle; and
   the vehicle dynamics control unit is further configured to:
   determine a minimum permissible rotational speed threshold and/or a minimum permissible slip setpoint for the first axle,
   determine a maximum permissible rotational speed threshold and/or a maximum permissible slip setpoint for the first axle,
   determine a minimum permissible rotational speed threshold and/or a minimum permissible slip setpoint for the second axle, determine a maximum permissible rotational speed threshold and/or a maximum permissible slip setpoint for the second axle, and output at least one of the determined minimum permissible rotational speed threshold for the first axle, minimum permissible slip setpoint for the first axle, maximum permissible rotational speed for the first axle, maximum permissible slip setpoint for the first axle, minimum permissible rotational speed threshold for the second axle, minimum permissible slip setpoint for the second axle, maximum permissible rotational speed threshold for the second axle, or maximum permissible slip setpoint for the second axle to the first and/or second electronic drive control unit.

4. The vehicle dynamics control system as claimed in claim 1, wherein the at least one electronic drive control unit further comprises:
 a first electronic drive control unit configured to control a first drive motor for driving a first axle; and
 a second electronic drive control unit, distinct from the first electronic drive control unit and the vehicle dynamics control unit, configured to control a second drive motor for driving a second axle; and the vehicle dynamics control unit is further configured to:
 determine a minimum permissible rotational speed threshold and/or a minimum permissible slip setpoint for the first axle,
 determine a maximum permissible rotational speed threshold and/or a maximum permissible slip setpoint for the first axle,
 determine a minimum permissible rotational speed threshold and/or a minimum permissible slip setpoint for the second axle,
 determine a maximum permissible rotational speed threshold and/or a maximum permissible slip setpoint for the second axle, and
 output at least one of the determined minimum permissible rotational speed threshold for the first axle, minimum permissible slip setpoint for the first axle, maximum permissible rotational speed for the first axle, maximum permissible slip setpoint for the first axle, minimum permissible rotational speed threshold for the second axle, minimum permissible slip setpoint for the second axle, maximum permissible rotational speed threshold for the second axle, or maximum permissible slip setpoint for the second axle to the first and/or second electronic drive control unit.

5. The vehicle dynamics control system as claimed in claim 4, wherein in the case of all wheel drives, a differential slip control process is configured to be carried out in which the at least one slip setpoint for one axle of the first and second axles is predefined as a function of an actual slip value of the other axle.

6. The vehicle dynamics control system as claimed in claim 4, further comprising:

an actuator configured to be actuated by the rotational speed control process, wherein
 the at least one electronic drive control unit is positioned more closely to the actuator than the electronic vehicle dynamics control unit.

7. The electronic vehicle dynamics control unit for a vehicle dynamics control system as claimed in claim 1, wherein the electronic vehicle dynamics control unit is further configured to:
 (i) determine at least one wheel-related or axle-related minimum permissible slip setpoint, and/or
 (ii) determine at least one wheel-related or axle-related minimum permissible rotational speed threshold and at least one wheel-related or axle-related maximum permissible slip setpoint, and/or
 (iii) determine at least one wheel-related or axle-related maximum permissible rotational speed threshold, and
 (iv) transmit at least one of the determined minimum permissible slip setpoint, minimum permissible rotational speed threshold and maximum permissible slip setpoint, or maximum permissible rotational speed threshold to the at least one drive unit in order to enable the at least one drive unit to perform the rotational speed control process itself as a function of the transmitted values.

8. The vehicle dynamics control system as claimed in claim 1, further comprising:

an actuator configured to be actuated by the rotational speed control process, wherein
 the at least one electronic drive control unit is positioned more closely to the actuator than the electronic vehicle dynamics control unit.

9. A vehicle dynamics control system in a motor vehicle, comprising:

an electronic vehicle dynamics control unit connected to and distinct from at least one electronic drive control unit and configured to:
 determine at least one slip setpoint or a slip setpoint corridor and an actual vehicle speed as a reference speed,
 determine a rotational speed setpoint in accordance with the at least one slip setpoint or a rotational speed setpoint corridor in accordance with the slip setpoint corridor, and
 transmit the rotational speed setpoint or the rotational speed setpoint corridor to the at least one electronic drive control unit, wherein
  the at least one electronic drive control unit, in accordance with the transmitted rotational speed setpoint or rotational speed setpoint corridor, is configured to carry out a rotational speed control process for compensating an impermissible deviation from the rotational speed setpoint or from the rotational speed setpoint corridor.

10. The vehicle dynamics control system as claimed in claim 9, wherein the slip setpoint corridor is predefined by a minimum permissible slip setpoint for an overrun mode and by a maximum permissible slip setpoint for a traction mode, and/or
the rotational speed setpoint corridor is predefined by a minimum permissible rotational speed threshold for the overrun mode and by a maximum permissible rotational speed threshold for the traction mode.

11. The vehicle dynamics control system as claimed in claim 10, wherein the at least one electronic drive control unit further comprises:
 a first electronic drive control unit configured to control a first drive motor for driving a first axle; and
 a second electronic drive control unit, distinct from the first electronic drive control unit and the vehicle dynamics control unit, configured to control a second drive motor for driving a second axle; and the vehicle dynamics control unit is further configured to:
  determine a minimum permissible rotational speed threshold and/or a minimum permissible slip setpoint for the first axle,
  determine a maximum permissible rotational speed threshold and/or a maximum permissible slip setpoint for the first axle,
  determine a minimum permissible rotational speed threshold and/or a minimum permissible slip setpoint for the second axle,
  determine a maximum permissible rotational speed threshold and/or a maximum permissible slip setpoint for the second axle, and
  output at least one of the determined minimum permissible rotational threshold for the first axle, minimum permissible slip setpoint for the first axle, maximum permissible rotational speed threshold for the first axle, maximum permissible slip setpoint for the first axle, minimum permissible rotational speed threshold for the second axle, minimum permissible slip setpoint for the second axle, maximum permissible rotational speed threshold for the second axle, or maximum permissible slip setpoint for the second axle to the first and/or second electronic drive control unit.

12. The vehicle dynamics control system as claimed in claim 9, wherein
  the at least one electronic drive control unit further comprises:
    a first electronic drive control unit configured to control a first drive motor for driving a first axle; and
    a second electronic drive control unit, distinct from the first electronic drive control unit and the vehicle dynamics control unit, configured to control a second drive motor for driving a second axle; and
  the vehicle dynamics control unit is further configured to:
    determine a minimum permissible rotational speed threshold and/or a minimum permissible slip setpoint for the first axle,
    determine a maximum permissible rotational speed threshold and/or a maximum permissible slip setpoint for the first axle,
    determine a minimum permissible rotational speed threshold and/or a minimum permissible slip setpoint for the second axle,
    determine a maximum permissible rotational speed threshold and/or a maximum permissible slip setpoint for the second axle, and
    output at least one of the determined minimum permissible rotational speed threshold for the first axle, minimum permissible slip setpoint for the first axle, maximum permissible rotational speed for the first axle, maximum permissible slip setpoint for the first axle, minimum permissible rotational speed threshold for the second axle, minimum permissible slip setpoint for the second axle, maximum permissible rotational speed threshold for the second axle, or maximum permissible slip setpoint for the second axle to the first and/or second electronic drive control unit.

13. The vehicle dynamics control system as claimed in claim 12, wherein
  in the case of all wheel drives, a differential slip control process is configured to be carried out in which the at least one slip setpoint for one axle of the first and second axles is predefined as a function of an actual slip value of the other axle.

14. The vehicle dynamics control system as claimed in claim 9, further comprising:
  an actuator configured to be actuated by the rotational speed control process, wherein
    the at least one electronic drive control unit is positioned more closely to the actuator than the electronic vehicle dynamics control unit.

* * * * *